(12) United States Patent
Huang et al.

(10) Patent No.: US 7,365,121 B2
(45) Date of Patent: Apr. 29, 2008

(54) HIGHLY CONDUCTIVE THERMOPLASTIC COMPOSITES FOR RAPID PRODUCTION OF FUEL CELL BIPOLAR PLATES

(75) Inventors: Jianhua Huang, Blacksburg, VA (US); Donald G. Baird, Blacksburg, VA (US); James E. McGrath, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 497 days.

(21) Appl. No.: 10/779,804

(22) Filed: Feb. 18, 2004

(65) Prior Publication Data

US 2004/0229993 A1 Nov. 18, 2004

Related U.S. Application Data

(60) Provisional application No. 60/447,727, filed on Feb. 19, 2003.

(51) Int. Cl.
*C08K 3/04* (2006.01)
*C08K 3/40* (2006.01)
*H01M 8/00* (2006.01)

(52) U.S. Cl. .................. 524/494; 524/495; 205/344; 427/115; 429/12

(58) Field of Classification Search ................ 524/494, 524/495; 205/344; 427/115; 429/12
See application file for complete search history.

(56) References Cited

U.S. PATENT DOCUMENTS

| | | | |
|---|---|---|---|
| 4,214,969 A | 7/1980 | Lawrance | |
| 4,339,322 A | 7/1982 | Balko et al. | |
| 5,614,312 A | 3/1997 | Tucker et al. | |
| 5,942,347 A | 8/1999 | Koncar et al. | |
| 6,248,467 B1 | 6/2001 | Wilson et al. | |
| 6,572,997 B1 | 6/2003 | Iqbal et al. | |
| 6,752,937 B2 * | 6/2004 | Butler | 252/511 |
| 2003/0089890 A1 * | 5/2003 | Niu et al. | 252/500 |
| 2003/0203266 A1 * | 10/2003 | Chervinko et al. | 429/34 |
| 2004/0076863 A1 | 4/2004 | Baars et al. | |
| 2006/0027792 A1 * | 2/2006 | Butcher et al. | 252/500 |
| 2006/0084750 A1 * | 4/2006 | Huang et al. | 524/495 |

OTHER PUBLICATIONS

Electric Resistivity/Conductivity Converter. <http://www.cactus2000.de/uk/unit/masscnd.shtml>. pp. 1-3, conversions for values 112, 150, 207 S/cm.*
F. Jousse et al. "Development of New Bi-Polar Plates Based on Electrically Conductive Filled Polymers for PEMFC" EUROMAT '99, Biannu. Meet. Fed. Eur. Mater. Soc. (FEMS) (2000). 13, 181-186.
J.G. Clulow et al. "Development of Vinyl Ester/Graphite Composite Bipolar Plates" Topical Conference Proceedings, 2002 AIChE Spring National Meeting, Mar. 10-14, 2002 New Orleans, LA pp. 417-425.
D. Haack et al. "Scale up Carbon/Carbon composite bipolar plates" Topical Conference Proceedings, 2002 AIChE Spring National Meeting Meeting, Mar. 10-14, 2002 New Orleans LA pp. 454-459.
Besmann et al. "Carbon/Carbon Composite Bipolar for Proton Exchange Membrane Fuel Cells" Journal of the Electrchemical Society, pp. 4083-4086; 2000.

* cited by examiner

*Primary Examiner*—Kriellion A Sanders
(74) *Attorney, Agent, or Firm*—Blank Rome LLP.

(57) ABSTRACT

A low cost method of fabricating bipolar plates for use in fuel cells utilizes a wet lay process for combining graphite particles, thermoplastic fibers, and reinforcing fibers to produce a plurality of formable sheets. The formable sheets are then molded into a bipolar plates with features impressed therein via the molding process. The bipolar plates formed by the process have conductivity in excess of 150 S/cm and have sufficient mechanical strength to be used in fuel cells. The bipolar plates can be formed as a skin/core laminate where a second polymer material is used on the skin surface which provides for enhanced conductivity, chemical resistance, and resistance to gas permeation.

24 Claims, 4 Drawing Sheets

HIGHLY CONDUCTIVE THERMOPLASTIC COMPOSITES FOR RAPID PRODUCTION OF FUEL CELL BIPOLAR PLATES

CROSS-REFERENCE TO RELATED APPLICATIONS

This application is related to U.S. Provisional Patent Application 60/447,727 filed Feb. 19, 2003, and the complete contents thereof is herein incorporated by reference.

STATEMENT OF GOVERNMENT INTEREST

This invention was made with government support under Contract Number DE-AC05-000R22725 awarded by the U.S. Department of Energy. The Government has certain rights in the invention.

BACKGROUND OF THE INVENTION

1. Field of the Invention

The present invention generally relates to highly conductive thermoplastic composites intended for the rapid and economical production of fuel cell bipolar plates, and the method for making the same.

2. Background Description

Bipolar plate materials have historically been metals coated with corrosion resistant layers or graphite with a seal treatment to lower the gas permeability. In both cases, the bipolar plates require extensive machining and post processing, resulting in hardware costs far more expensive than the costs for the raw materials alone. To date, the costs of bipolar plates dominate the stack costs. Unless bipolar plates that are considerably less expensive are developed, PEM (Proton Exchange Membrane or Polymer Electrolyte Membrane) fuel cells cannot easily be applied to civilian markets to compete with established power technology.

As one of the key and costly components of PEM fuel cells, the bipolar plates must have high electrical conductivity, sufficient mechanical integrity, corrosion resistance, low gas permeability, and low-cost in both materials and processing when applied to the civil market. To replace graphite bipolar plates and lower the cost, a variety of composite bipolar plates have been developed. Most of them were made by compression molding of polymer matrices (thermoplastic or thermoset resins) filled with conductive particles (such as graphite powders) or fibers. Because most polymers have extremely low electronic conductivity, excessive conductive fillers have to be incorporated, and it is very difficult to get high conductivity and sufficient mechanical properties at the same time. To solve this problem, Oak Ridge National Laboratory (ORNL) recently developed carbon/carbon composite bipolar plates. The manufacture process consists of multiple steps, including the production of carbon fiber/phenolic resin preforms (by slurry-molding or wet-lay process) followed by compression molding, and the pyrolysis and densification on the surface by a chemical vapor infiltration (CVI) process. The plates have high conductivity (about 200-300 S/cm), and the technology has been transferred to Porvair Fuel Cell Technology for scale up. However, this process is too complicated and is by no means economic.

SUMMARY OF THE INVENTION

It is, therefore, an object of the present invention to provide highly conductive thermoplastic composites which can be used for rapid production of fuel cell bipolar plates.

According to the invention, economical fuel cell bipolar plates that have high electrical conductivity and good mechanical properties are produced. The composite comprises graphite particles, thermoplastic fibers, and carbon or glass fibers, and is produced by a wet-lay process to yield highly formable sheets. The sheets together with additional graphite particles are then stacked and compression molded to form bipolar plates with gas flow channels and other features. Plates containing 65 wt % graphite had a bulk conductivity over 200 S/cm, well exceeding the Department of Energy (DOE) target (100 S/cm) for composite bipolar plates. This value of conductivity is also the highest of all polymer composites with the same or similar graphite loadings, reaching the range of carbon/carbon composite bipolar plates (200-300 S/cm) as reported by the Oak Ridge National Laboratory and Porvair Fuel Cell Technology (see Haack, "Fuel Cell Technology: Opportunities and Challenges", Topical Conference Proceedings, 2002 AIChE Spring National Meeting, Mar. 10-14, 2002, pp. 454-459). The tensile strength and modulus of composites produced by this method are 36.5 MPa and 12.6 GPa, respectively. Because the plates can be generated without high temperature pyrolysis (for carbonization) and chemical vapor infiltration (for densification), they can be manufactured at much less cost compared to the carbon/carbon plates.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention provides a method for producing economical bipolar plates with high electrical conductivity and mechanical properties. The composite comprises graphite particles, which may be natural or synthetic are preferably of a size ranging from −35l+100 Tyler mesh size; thermoplastic fibers which preferably are fine (about 0.5 to 20 denier) and have a length of about 1 to 5 cm (and may have a surface treated with a dispersing aid); and reinforcing fibers which are preferably of a size ranging from 20 microns to 1.5 inches. The graphite particles serve the function of providing electrical conductivity and are preferably present in the composite at a weight percentage (wt %) of 50 to 90 wt % and most preferably 65 to 85 wt %. The thermoplastic fibers serve the function of melting and adhering to the carbon or glass fibers and solidifying to form a mat or sheet material with the carbon or glass or ceramic fibers held together with the graphite particles impregnated in the thermoplastic and adhering to the mat. The thermoplastic fibers are preferably present at 10-50 wt %, and most preferably at 20-40 wt %. The choice of thermoplastic fibers can vary widely depending on the application, and suitable examples are polyesters, polyamides (e.g. nylon 6, 66, 11, 12, 612 and high temperature nylons such as nylon 46), polypropylene, copolyetheresters, polyphenylene sulfide, polyethylene terephthalates, polybutylene terephthalate, polyetheretherketones, polyeetherketoneketones, and liquid crystalline polymer fibers, and mixtures thereof. Examples of suitable reinforcing fibers include but are not limited to glass fibers, carbon fibers, metal fibers, polyaramid fibers (e.g., Kevlar®), and metal whiskers. Glass and carbon fibers are preferred for use as the reinforcing fibers, and the reinforcing fibers provide structural rigidity to the mat or sheet material and the composite which is ultimately produced. The reinforcing fibers are preferably present at 5-15 wt %.

The composite is preferably formed from a plurality of fibrous mats or sheet materials, each of which are made by a wet-lay process which yields highly formable sheets. A number of wet-lay processes could be used in the practice of this invention. An example of a suitable wet-lay process for forming sheet materials is described in U.S. Pat. No. 5,614,312 to Tucker et al., which is herein incorporated by reference. The sheets, preferably together with additional graphite particles, are then stacked and compression molded to form bipolar plates with gas flow channels and other features. In particular, the sheets can have additional graphite powder sprayed, poured, or otherwise deposited on their surfaces prior to being stacked together as well as on the top and bottom of the stack, such that upon molding, the molded bipolar plate includes a suitable amount of graphite powder.

Figure 1:
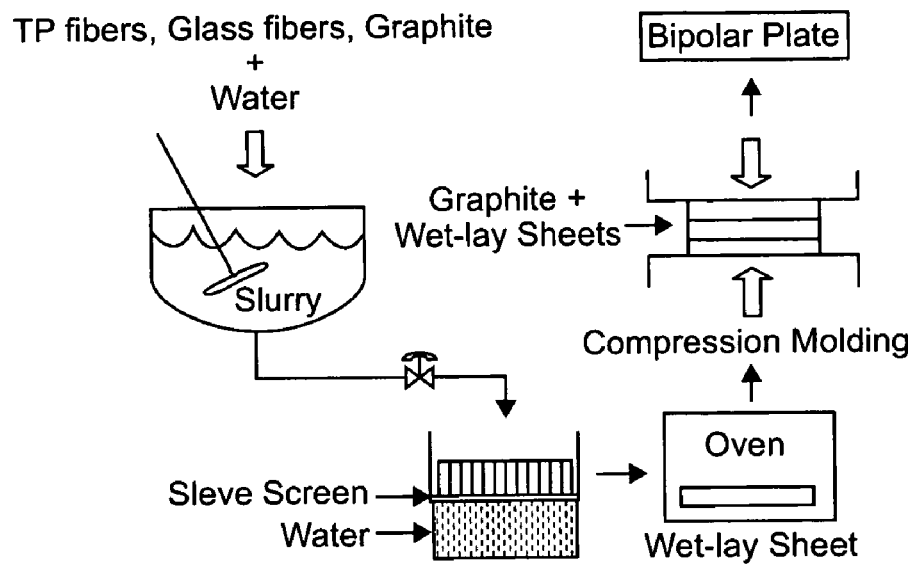
FIG. 1 is a schematic drawing of the wet-lay and compression molding processes used for generating bipolar plates.

FIG. 1 illustrates a wet lay process which may be used within the practice of the present invention. First, polymer fibers, such as thermotropic liquid crystalline polymers as noted in U.S. Pat. No. 5,614,312 to Tucker, reinforcing fibers such as glass fibers, and graphite particles are combined with water to form a slurry 10. The slurry 10 is pumped by pump 12 and deposited on a sieve screen 14. The sieve screen 14 is preferably a moving conveyor belt, and serves the function have separating the water 16 from the polymer fibers, glass fibers and graphite. The polymer fibers, reinforcing fibers and graphite form a wet lay sheet 18 which is placed in or conveyed through an oven 20. Upon heating to a temperature sufficient to melt the polymer fibers, the wet lay sheet 18 is permitted to cool and have the polymer material solidify. Upon solidification, the wet lay sheet takes the form of a sheet material with glass reinforcing fibers held together by globules of polymer material, and graphite particles adhered to the sheet material by the polymer material. Several of these sheets are then stacked, preferably with additional graphite powder interspersed between sheets, and compression molded in press 22. After application of heat and pressure in the press 22, one or more formed bipolar plates 24 are obtained, where the bipolar plates are a composite of glass fibers, polymer matrix and graphite particles. These bipolar plates have sufficient electrical conductivity, mechanical integrity, corrosion resistance, and low gas permeability to be useful in PEM fuel cell applications. Further, it has also been found that the conductivity, chemical resistance, and resistance to gas permeation can be improved by using a skin/core laminate where the skin of the composite is made using a polymer material different from the core (e.g., a polyvinyldifluoride (PVDF)) without adversely impacting the mechanical properties of the bipolar plates. The choice of polymeric material can vary depending on the application. The laminate design of this invention can allow a central core of the bipolar plate to have enhanced mechanical stability, while an outer skin has enhanced conductivity (which can be increased by adding graphite powder to the skin prior to compressing the stack), chemical resistance, and increased resistance to gas permeability.

For comparison purposes, conductivity of the of the bipolar plates produced by the above-described method was compared against polymer composites of similar graphite loading. Table 1 presents the results of this comparison.

TABLE 1

Properties of conductive polymer composites for bipolar plates

| Matrix | Filler | wt % Filler Content | Conductivity (S/cm) | Reference |
| --- | --- | --- | --- | --- |
| Epoxy | graphite | 70 | 10–30 | F. Jouse[1] |
| Phenolic resin | graphite | 77.5 | 53 | U.S. Pat. No. 5,942,347 |
| Fluoropolymer | graphite | 74 | 119 | U.S. Pat. No. 4,214,969 |
| Fluoropolymer | graphite & CF | 74 | 109 | U.S. Pat. No. 4,339,322 |
| Vinyl ester | graphite | 68 | 85 | U.S. Pat. No. 6,248,467 |
| Thermoplastics (polyester) | graphite | 65 | 230–250 | present work |

Furthermore, many of the prior processes yield bipolar plates with inadequate or non-optimal mechanical properties. For example, the flexural and tensile strengths (in MPa) for vinyl ester/graphite composites as described in U.S. Pat. No. 6,248,467, and commercial variants thereof available from Premix, Inc. and BMC, Inc., as well as the results reported by Clulow et al. "Development of Vinyl Ester/Graphite Composite Bipolar Plates" in Fuel Cell Technology: Opportunities and Challenges Topical Conference Proceedings, 2002 AIChE Spring National Meeting, Mar. 10-14, 2002, pp. 417-425, ranged from 28.2 MPa to 40 MPa for flexural strength, and from 23.4 to 26.2 MPa for tensile strength. The fluoropolymer and graphite composite described in U.S. Pat. No. 4,214,969 had a flexural strength ranging from 35.1 to 37.2 MPa, and the fluoropolymer, graphite and carbon fiber matrix of U.S. Pat. No. 4,339,322 had a flexural strength of 42.7 MPa. By contrast, the bipolar plates made by the present invention had a flexural strength of 53.0±2.35 MPa and a tensile strength of 36.5±2.06 MPa. Compared to the ORNL technology, the technology of the present invention can produce quality bipolar plates (with the same conductivity) at much lower cost. In particular, no chemical vapor infiltration (CVI) process or pyrolysis process is involved which represents over 70% of total cost of C/C plates. Thus, the invention has great commercial value and should allow the viable, private sector commercialization of the fuel cell technology.

A distinct advantage of using the porous sheets formed by the wet-lay process is the ability to enhance the level of graphite relative to that in the initial porous sheet. Fore example, graphite powder can be doctor bladed onto the surface of the sheets forcing it into the porous regions. Additional levels of graphite on the order of 35 wt % can be added.

In the practice of this invention it is preferred to kraft a bipolar plate with a conductivity in excess of 150 S/cm, which has sufficient mechanical strength and resistance to degradation to allow use in the fuel cell environmen. In the bipolar plate, the thermoplastic is present as a matrix, having been derived from melting fibers and then re-solidifying, and the graphite powder is dispersed throughout the plate and at its surfaces, and may be more concentrated in a skin polymer. Further, the reinforcing fibers are distributed throughout the plate, and may be concentrated in the core rather than in a skin polymer if a laminate structure is produced. Having a flexural strength in excess of 45 MPa and preferably in excess of 50 MPa is preferred. Having a tensile strength in excess of 30 MPa and preferably in excess of 35 MPa is preferred. Using a skin polymer can provide enhanced resistance to gas permeability and also allow for enhanced conductivity, particularly if the skin includes additional graphite particles. Bipolar plates which can be used in fuel cells can be cost effectively molded, using either compression or injection molding or a suitable alternative, from a set of stacked sheet materials formed from a wet lay process that combines the graphite, thermoplastic, and reinforcing fibers into mats, where the mats can be stacked and accept features such as guides and the like being formed during the molding process.

While FIG. 1 shows that the porous composite sheets are stacked in the mold and consolidated and formed at the same time, it may be advantageous to consolidate the sheets first. The consolidated sheets then can be cut to size to form a blend which can be heated and then compression molded to form a bipolar plate.

EXAMPLE 1

Wet-lay sheets made from 50 wt % graphite particles, 40 wt % polyester fibers and 10 wt % glass fibers were produced by means of the wet-lay process described in conjunction with FIG. 1. Polyester may or may not be an ideal matrix for application in fuel cell environment, however use of this material in no way impaired testing the concept. In fact, the wet-lay sheet can be generated with almost any thermoplastic fibers, including thermotropic liquid crystalline polymer (TLCP) fibers. TLCPs are known as excellent matrices for fuel cell applications. The graphite powder that was added in the compression molding step was TIMREX provided by Timcal America Inc.

The sheet materials were cut according to the mold size and stacked together with additional graphite powders in the mold. The assembly was placed in a hydraulic press and pressed at 277° C. and 900~1500 psi for 10 minutes. Then the platen heaters were turned off and the mold was allowed to cool. The pressure was maintained until the mold temperature reached 200° C. The pressure was then allowed to drop as mold temperature deceased further. When the mold temperature reached 30° C., the platens were opened and the assembly was removed from the press. The flat plaque or bipolar plate with gas flow channels was then removed from the mold.

The bulk conductivities (in-plane) were measured using the van der Pauw method according to ASTM Standard F76-86. The typical size of the specimens is 25.4 mm in diameter and 1~2 mm in thickness. The sheet resistance, $R_S$, was obtained from the two measured characteristic resistances $R_A$ and $R_B$ by numerically solving the van der Pauw equation:

$$\exp(-\pi R_A/R_S)+\exp(-\pi R_B/R_S)=1$$

The resistivity $\rho$ is given by $\rho=R_S d$, where d is the thickness of the specimen. The volume conductivity $\sigma=1/\rho$.

The tensile and flexural (three-point bending) tests were performed at room temperature (23° C.) on an Instron 4204 tester in accordance with ASTM D638 and D790 standards, respectively. The specimen sizes were of L(Length)×W (Width)=76.2×7.7 mm for the tensile test, and L×W=76.2× 12.7 mm for the flexural test. The thickness of the samples was about 2 mm.

Figure 2:
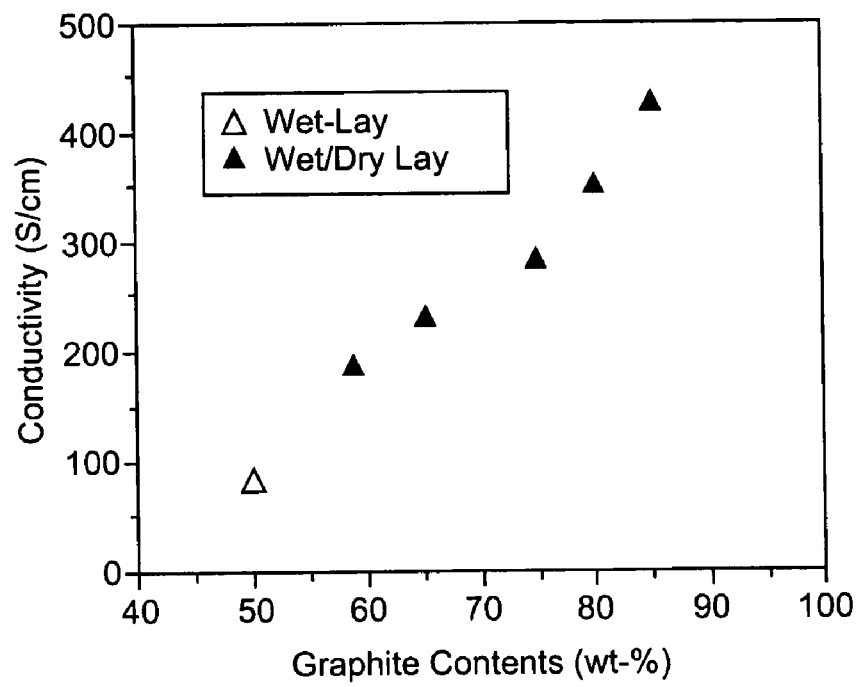
FIG. 2 is a graph showing the conductivity of wet-lay and wet/dry composite materials.

FIG. 2 presents the bulk conductivities (in-plane) of compression-molded plaques using wet-lay sheets (wet-lay material) or wet-lay sheets plus additional graphite (wet/dry lay material). It was noted that the graphite content of the wet/dry lay materials could reach 85 wt %, which is much higher than what the wet-lay sheets could hold as described in Tucker et al., U.S. Pat. No. 5,614,312. As the graphite content increases, a significant increase in bulk conductivity was observed. Because the composites with graphite higher than 75% have apparently poor mechanical properties, further research was focused on the material with 65% graphite.

The bulk conductivities (in-plane) of wet/dry (W/D) lay material and other state-of-the-art composite materials for bipolar plates are listed above in Table 1. The plates containing 65 wt % graphite have a bulk conductivity of over 200 S/cm, well exceeding the DOE target (100 S/cm) for composite bipolar plates. This value of conductivity is also the highest of all polymer composites with the same or similar graphite loadings, reaching the range of carbon/ carbon composite bipolar plates (200~300 S/cm) developed by the Oak Ridge National Laboratory and Porvair Fuel Cell Technology. The inventive technology described herein involves no pyrolysis and CVI processes which represent over 70% of total cost of cabon/carbon (C/C) plates (see Besmann, *J. Electrochem. Soc.* 147:4083-4086 (2000)), and it should be possible to manufacture the plates at much less cost compared to the C/C plates.

In addition to the electrical conductivity, the bipolar plates should also have adequate mechanical properties to be applied in the fuel cell stacks. However, for polymer composites doped with conductive particles or fibers, it is difficult to get high conductivity and sufficient mechanical properties at the same time. Compared to the mechanical properties of wet/dry (W/D) lay material and other composite plates, the flexural and tensile strengths of W/D lay composite are 53.0 MPa and 36.5 MPa, respectively. Both are the highest in all polymer composite plates with the same or similar graphite loadings. It is noted that Besmann et al. Reported flexural strength of 175 MPa for their carbon/ carbon plates. However, because the property was obtained by means of a biaxial flexure test, not the standard three-point flexure as defined by ASTM D790, it is difficult to compare their results with the strength data found for the present materials.

Figure 3:
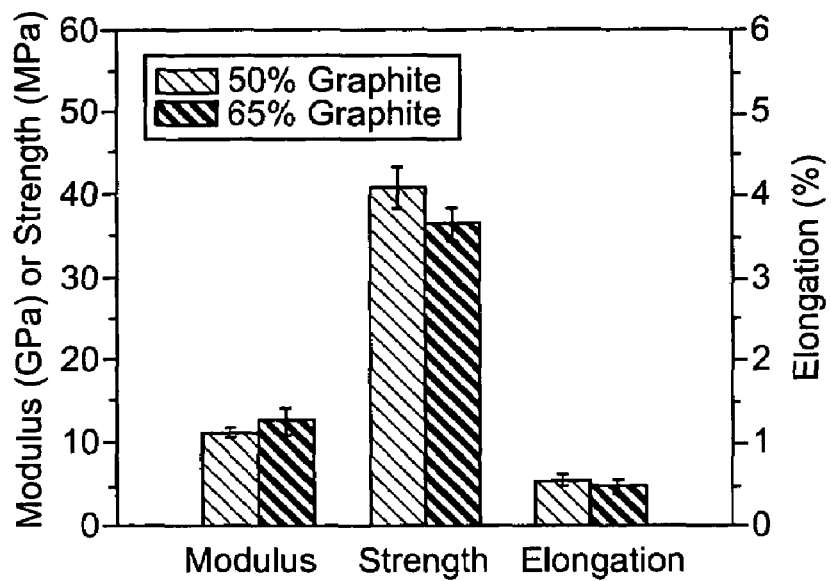
FIG. 3 is a bar graph showing the tensile properties of compression molded wet/lay and wet/dry lay composites.
Figure 4:
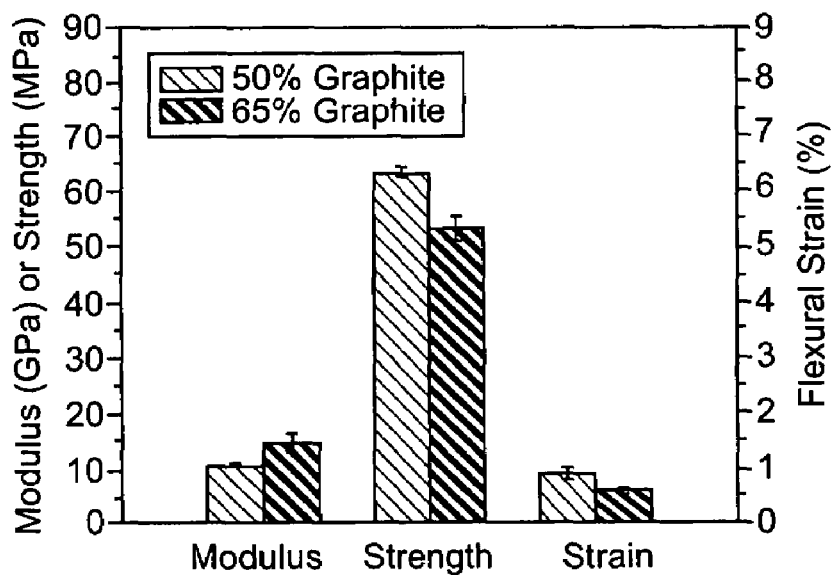
FIG. 4 is a bar graph showing the flexural properties of compression molded wet-lay and wet/dry lay composites.

It is apparent that the mechanical properties of the wet/dry lay material have a close relation with the structure of the wet-lay sheet materials. It has been shown that compression molded wet-lay material has excellent mechanical properties in U.S. Pat. No. 5,614,312 to Tucker, which is herein incorporated by reference. This is believed to be the result of the unique structure of the wet-lay sheets, including the interaction of the reinforcing fibers and the layered structures formed in the slurry-making process. FIGS. 3 and 4 present the mechanical properties of wet/dry lay materials as compared to the wet-lay materials (containing 50 wt % graphite). As graphite content increases from 50 wt % to 65 wt %, the modulus of the material increases, which can be attributed to the addition of graphite powder which has a modulus significantly higher than that of the matrix (polyester). In contrast, the strength and maximum strain decrease in both tensile and flexural tests. This may also be attributed to the addition of graphite powder that acts like defects in the polymer matrix when the composite undergoes a tensile or flexural test. The loss of tensile or flexural strength in W/D lay composites may also be caused by the decrease of glass fiber contents after more graphite (in addition to that contained in the wet-lay materials) is added. In fact, W/D lay material containing 65% graphite has only 7 wt % glass, which is less than original wet-lay material (10 wt %) by 30%. Nevertheless, as can be seen from FIGS. 3 and 4, W/D lay composites still have 89% tensile strength and 84% flexural strength relative to the wet-lay materials. That is, the W/D lay materials containing 65% graphite still retain the good mechanical properties offered by the reinforcing fibers and layered structures in the wet-lay sheets.

Figure 5:
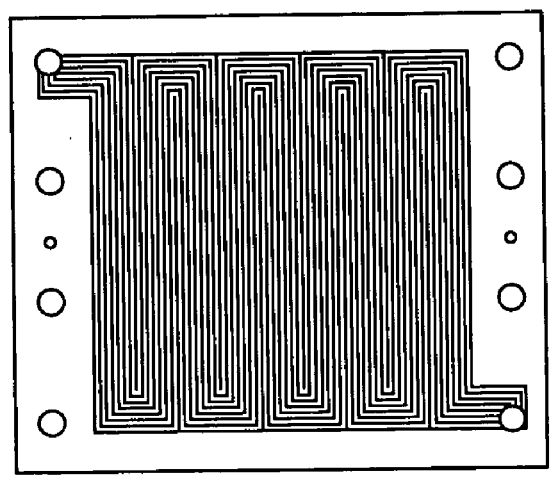
FIG. 5 is a photograph of a compression molded bipolar plate with wet/dry lay materials.

For all composite materials for bipolar plates, the formability of the material is very important if the gas flow channels are to be readily formed during a molding process. This is because the flow channels in bipolar plates are numerous (i.e. densely spaced), narrow and relatively deep, e.g. 0.8 mm or 1/32 inch in width and depth. For composite containing stacks of wet-lay mats, experiments were conducted to determine whether the material is deformable enough to allow the formation of the channels and other features of bipolar plates as required during compression molding. If not, the flow channels would have to be machined and the advantages of polymer composites would vanish. To evaluate the formability of the wet/dry lay composite, a mold was made with a few straight grooves based on a standard bipolar plate design (7-channel, Los Alamos National Laboratory) and this mold was used in the compression molding. The results showed that the composite has good formability, and the flow channels (simplified) formed are as good as other composite systems. On this basis, a standard mold was designed and fabricated for making the composite bipolar plates. FIG. 5 presents a bipolar plate generated with this mold and wet/dry lay materials. It can be seen that the composites are highly formable and complicated flow channels and other features of the bipolar plates can be readily generated by compression molding.

EXAMPLE 2

Due to the hydrolysis of polyethylene terephthalate (PET) in the presence of water and elevated temperature, there may be disadvantages to using this material in PEM fuel cells. However, good mechanical properties and low cost. Therefore, a skin-core or laminate composite structure may be preferable for making bipolar plates for use in PEM fuel cells. Because the bipolar plate has skin and core layers, the polymers that cannot serve as matrix for a bipolar plate in the whole may become an ideal matrix for the skin or core layers only.

Experiments were conducted to demonstrate the possibility of taking advantage of PET as a binder in the manufacture of bipolar plates with no hydrolytic degradation concern. More specifically, the composite sheets consisting of graphite particles, polyester and glass fibers are first generated by means of a wet-lay process as described in Example 1. The porous sheets are then stacked with additional graphite particles and covered with a mixture of fluoropolymer and graphite particles and compression molded to form layered composite bipolar plates with gas flow channels. In such laminate bipolar plates, the low-cost polyester and glass in the core contribute strength and stiffness while the fluoropolymer in the outer layer provides an excellent barrier to $H_2$, $O_2$, water and corrosive chemicals. As a result, the new bipolar plates have not only low cost and high electrical and mechanical properties, but also excellent chemical resistance.

The laminate or skin-core composite materials were prepared using the following materials and procedures. The wet-lay sheets made from 50 wt % graphite particles, 40 wt % polyester fibers and 10 wt % glass fibers were generated by means of the wet-lay process depicted in FIG. 1. The sheet materials were cut according to the mold size and stacked together with additional graphite powders (TIMEREX provided by Timcal America Inc.), and covered with the mixture of poly(vinylidene fluoride) (Kynar 761 provided by Atofina Chemicals) and graphite particles. The assembly was then placed in a hydraulic press and pressed at 277° C. and approximately 900-1500 psi for 10 minutes. Then the platen heaters were turned off and the mold was allowed to cool. The pressure was maintained until the mold temperature reached 150° C. The pressure was then allowed to drop as the mold temperature decreased further. When the mold temperature reached 30° C., the platens were opened and the assembly was removed from the press. The plate with the gas flow channels was then removed from the mold.

The bulk conductivity (in-plane) was measured using a four probe method based on ASTM F76-86 (Test Method B). Eight specimens (76.2 mm long and 7.7 mm wide by 2 mm thick) were cut from the compression molded plaque with a size of 76.2 mm by 76.2 mm by 2 mm. The measurement was made for each specimen in the following way. The specimen attached to two probes was connected to a DC source to allow a constant current to pass through the specimen. The voltage drop was measured at the center over 25 mm of length of the specimen with the other two probes connected to a Keithley digital multimeter. The conductivity values for the eight specimens were then averaged to give the final conductivity value of the sample. All specimens were tested at ambient conditions.

The tensile and flexural (three-point bending) tests were performed at room temperature (23° C.) on an Instron 4204 tester using ASTM D638 and D790 standards, respectively. The specimen sizes were of L(Length)×W(Width)=76.2×7.7 mm for the tensile test, and L×W=76.2×12.7 mm for the flexural test. The thickness of the samples was about 2 mm.

For a polymer resin to be used for skin layers of laminate bipolar plates, the polymer should meet a number of requirements, including excellent chemical resistance, being moldable at a temperature matching that of PET (because the PET-based wet-lay material is used in the core), excellent electrical conductivity after doped with graphite fillers, and formation of the composite with good adhesion at interfaces. Considering that Poly(vinylidene fluoride) (PVDF) has excellent chemical resistance and electrical conductivity when doped with excessive graphite particles, as well as broad processing temperature range (from 175° C. to above 300° C.) that overlaps with the molding temperature of PET, Kynar 761, a powder form of PVDF produced by Atofina Chemicals, was chosen as the binder in the skin layers.

The processing and compression molding conditions for laminate bipolar plates are basically the same as the wet/dry lay composite plates as was described previously, except for that in the top and bottom layers a mixture of Kynar 761 and graphite powders was used to form protective (skin) layers. More specifically, the composite comprising graphite particles, thermoplastic (PET) fibers and carbon or glass fibers is generated by means of a wet-lay process to yield highly formable sheets. The sheets together with additional graphite particles are then stacked, covered with the mixture of fluoropolymer and graphite particles, and compression molded at about 277° C. to form bipolar plates with gas flow channels and other features.

Figure 6:
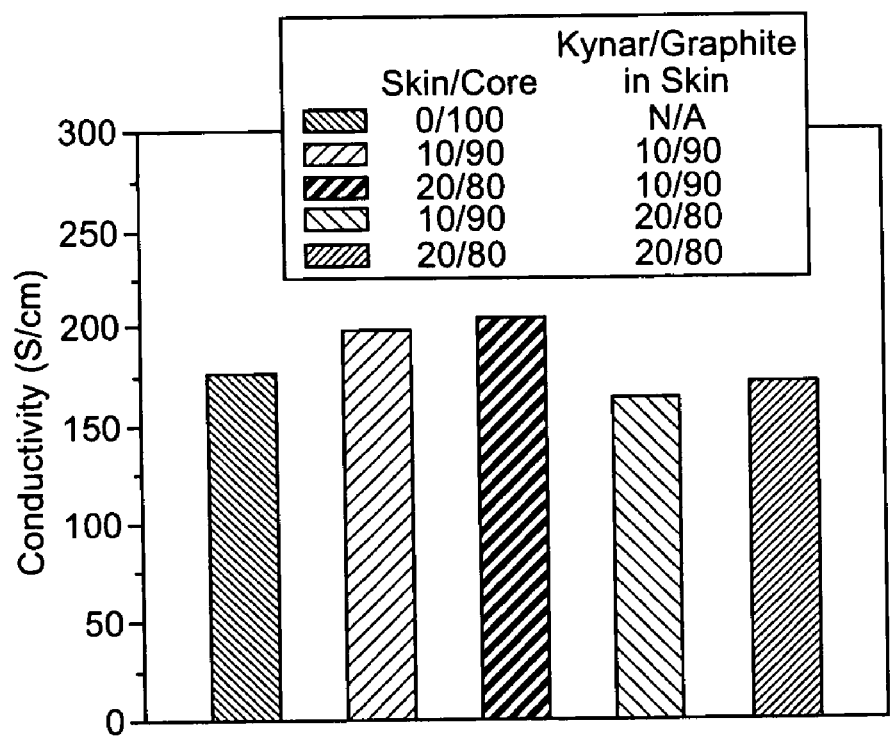
FIG. 6 is a graph showing the electrical conductivity of laminate composite materials.

It is desired that such laminate composite bipolar plates have not only improved chemical resistance, but also excellent electrical conductivity and mechanical properties as was observed for wet/dry lay composite materials (that is, the core materials here). FIG. 6 presents the bulk conductivities (in-plane) of compression-molded composite plaques with and without skin layers. It can be seen that the laminate composites have the same or even higher (when skin layer contains 90% of graphite) conductivity as compared to the core material which contains 65% graphite only. All of the composite materials have electrical conductivity higher than that of the DOE target (100 S/cm) for composite bipolar plates.

Figure 7:
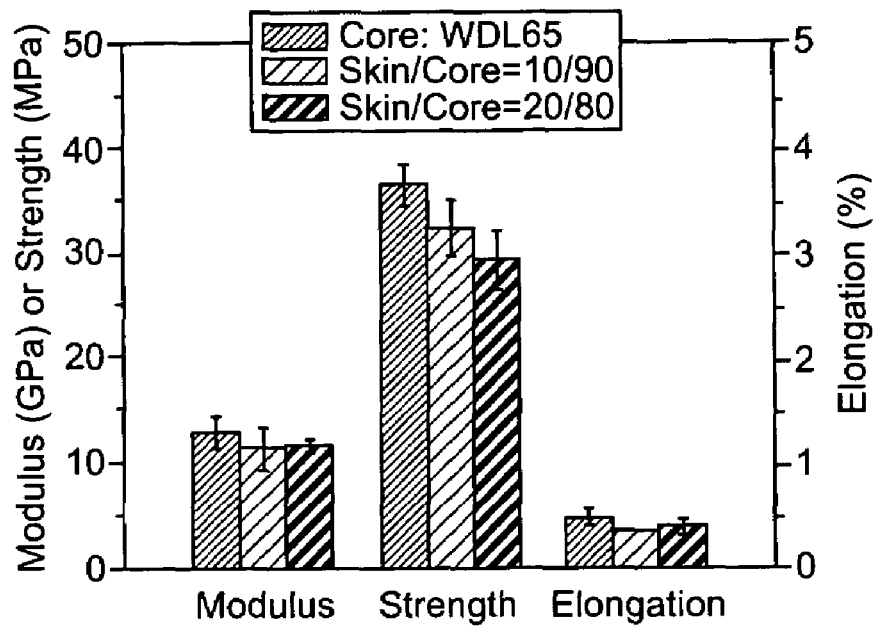
FIG. 7 is a bar graph showing the tensile properties of compression molded laminate composite materials.
Figure 8:
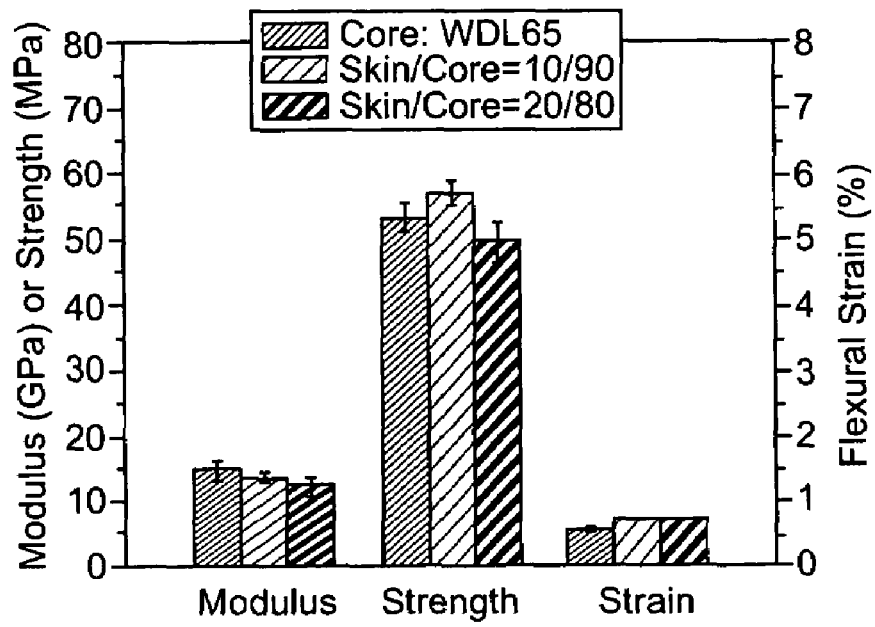
FIG. 8 is a bar graph showing the flexural properties of compression molded laminate composites.

In addition to the electrical conductivity, the bipolar plates should also have adequate mechanical properties to be applied in the fuel cell stacks. However, for polymer composites doped with conductive particles or fibers, it is difficult to get high conductivity and sufficient mechanical properties at the same time. FIGS. 7 and 8 present the mechanical properties of wet/dry lay material with and without skin layers. As was noted in Example 1, the wet/dry materials have the flexural and tensile strengths of 53.0 MPa and 36.5 MPa, respectively, representing the best of all polymer composite plates with the same or similar graphite loadings. Because the skin layers consisting of PVDF and graphite are not as strong as the PET based wet/dry lay materials (core material), it is expected that the mechanical properties of laminate composite would be somewhat lower than the wet/dry lay materials. This change was observed in the tensile data as shown in FIG. 7. The loss in tensile strength is, however, not serious according to the test. This is also expected because the proportion of skin layers is only 10 or 20% of the whole plate. In contrast to the tensile behavior, the laminate composites did not lose flexural strength as the skin layer was added (see FIG. 8). It is, thus, concluded that, the addition of 10 to 20% skin layers has only minor, if any, influence on the mechanical properties of wet/dry lay materials.

The advantage of this laminate structure can also be seen when it is compared to the material consisting of PVDF (Kynar) and graphite (the same components used in the skin layers). In Table 2 are presented the electrical and mechanical (flexural) properties for these two kinds of materials.

TABLE 2

Property comparison for composite bipolar plates

| Binders | Fillers, wt % | Conductivity (S/cm) | Flexural strength MPa | Source |
|---|---|---|---|---|
| Kynar | 74% graphite | 119 | 37.2 | U.S. Pat. No. 4,214,969 |
| Kynar | 74% graphite and CF | 109 | 42.7 | U.S. Pat. No. 4,339,322 |
| Kynar + PET | 66.5% graphite skin/core = 10/90; Kynar/graphite = 20/80 (skin) | 171 | 60.2 | This invention |
| Kynar + PET | 68% graphite skin/core = 20/80, Kynar/graphite = 20/80 (skin) | 163 | 54.4 | This invention |

The Kynar/graphite composite developed by GE has electrical conductivity of 119 S/cm and flexural strength of 37.2 MPa. After carbon fiber was added as reinforcement, the flexural strength rose to 42.7 MPa while electrical conductivity decreased to 109 S/cm. In comparison, the laminate composites of the present invention have much better performance in both electrical conductivity and mechanical properties. In addition, the laminate composites have lower raw material cost as the price of PET is much lower than that of PVDF.

Compression molded bipolar plates, similar to that described in Example 1 and shown in FIG. 5, were made in a similar manner with similar results from the skin/core material described in Example 2.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A method of manufacturing fuel cell bipolar plates, comprising the steps of:
   forming using a wet-lay process a composite material comprising graphite particles, thermoplastic polymer, and reinforcing fibers, wherein the bulk conductivity is at least 150 S/cm;
   depositing at least a second polymer on a top and bottom of said composite material; and
   producing the bipolar plates from the composite material with the deposited second polymer.

2. The method of claim 1 wherein said producing step is performed by compression molding.

3. The method of claim 1 wherein said forming step includes the steps of: forming a plurality of sheets from graphite particles, thermoplastic fibers and reinforcing fibers using a wet-lay process; consolidating a stack of said plurality of sheets; obtaining a blank from a consolidated stack, wherein said blank is used in said molding step.

4. The method of claim 1 wherein said reinforcing fibers are selected from the group consisting of carbon and glass.

5. The method of claim 1 wherein said producing step introduces at least one feature into said bipolar plates.

6. The method of claim 5 wherein said at least one feature is a gas flow channel.

7. The method of claim 1 wherein said depositing step comprises depositing a second polymer different from said thermoplastic polymer on the top and the bottom of said composite material.

8. The method of claim 1 wherein the depositing step comprises depositing the second polymer and graphite particles on the top and the bottom of said composite material.

9. The method of claim 1 wherein said forming and producing steps occur simultaneously or sequentially.

10. The method of claim 1 wherein said composite material produced in said forming step includes a first polymer in a core of said composite material and another polymer, different from said first polymer, on a surface of said core.

11. The method of claim 1, wherein the graphite particles are in an amount of at least 50 wt %.

12. The method of claim 1, wherein the graphite particles are in an amount of at least 65 wt %.

13. A method of manufacturing fuel cell bipolar plates, comprising the steps of:
   forming a composite material comprising graphite particles, thermoplastic polymer, and reinforcing fibers, wherein the bulk conductivity is at least 150 S/cm;

depositing at least a second polymer on a top and bottom of said composite material; and producing the bipolar plates from the composite material with the deposited second polymer.

14. The method of claim 13 wherein said producing step is performed by compression molding.

15. The method of claim 13 wherein said forming step includes the steps of: forming a plurality of sheets from graphite particles, thermoplastic fibers and reinforcing fibers using a wet-lay process; consolidating a stack of said plurality of sheets; obtaining a blank from a consolidated stack, wherein said blank is used in said molding step.

16. The method of claim 13 wherein said reinforcing fibers are selected from the group consisting of carbon and glass.

17. The method of claim 13 wherein said producing step introduces at least one feature into said bipolar plates.

18. The method of claim 17 wherein said at least one feature is a gas flow channel.

19. The method of claim 13 wherein said depositing step comprises depositing a second polymer different from said thermoplastic polymer on the top and the bottom of said composite material.

20. The method of claim 13 wherein the depositing step comprises depositing the second polymer and graphite particles on the top and the bottom of said composite material.

21. The method of claim 13 wherein said forming and producing steps occur simultaneously or sequentially.

22. The method of claim 13 wherein said composite material produced in said forming step includes a first polymer in a core of said composite material and another polymer, different from said first polymer, on a surface of said core.

23. The method of claim 13, wherein the graphite particles are in an amount of at least 50 wt%.

24. The method of claim 13, wherein the graphite particles are in an amount of at least 65 wt%.

* * * * *